United States Patent [19]

Okamoto et al.

[11] 4,207,082
[45] Jun. 10, 1980

[54] APPARATUS FOR THE CONTINUOUS PURIFICATION OF EXHAUST GAS CONTAINING SOLVENT VAPORS

[75] Inventors: Tsuneo Okamoto; Heiichiro Murakami, both of Iwaki, Japan

[73] Assignee: Kureha Kagaku Kogyo Kabushiki Kaisha, Tokyo, Japan

[21] Appl. No.: 706,618

[22] Filed: Jul. 19, 1976

[30] Foreign Application Priority Data

Jul. 25, 1975 [JP] Japan ................................. 50-90868

[51] Int. Cl.² ............................................. B01D 53/12
[52] U.S. Cl. ........................................... 55/60; 55/62;
55/79; 55/181; 55/390
[58] Field of Search ................ 55/34, 60, 62, 79, 181,
55/390, 474

[56] References Cited

U.S. PATENT DOCUMENTS

| | | |
|---|---|---|
| 2,527,964 | 10/1950 | Robinson .................................. 55/60 |
| 2,583,352 | 1/1952 | Berg ........................................ 55/60 |
| 2,616,515 | 11/1952 | Berg ........................................ 55/60 |
| 2,738,857 | 3/1956 | Drew .................................... 55/62 X |
| 2,883,333 | 4/1959 | Oliver ................................. 55/79 X |
| 3,093,465 | 6/1963 | Latta ....................................... 55/60 |

*Primary Examiner*—Robert H. Spitzer
*Attorney, Agent, or Firm*—Stevens, Davis, Miller & Mosher

[57] ABSTRACT

An apparatus for purifying an exhaust gas containing solvent vapours by bringing the exhaust gas and adsorbent particles into continuous mutual contact to adsorb the solvent vapours onto the adsorbent particles and subsequently regenerating the adsorbent particles containing the solvent vapours thus adsorbed and simultaneously recovering the solvent vapours. In regenerating the adsorbent particles containing the solvent vapours, the apparatus is capable of advantageously using an incondensable inert gas as a carrier gas for regenerating the adsorbent particles.

3 Claims, 2 Drawing Figures

APPARATUS FOR THE CONTINUOUS PURIFICATION OF EXHAUST GAS CONTAINING SOLVENT VAPORS

FIELD OF THE INVENTION

The present invention relates to an apparatus for effecting a continuous purification of an exhaust gas containing solvent vapours and simultaneously recovering the solvent.

BACKGROUND OF THE INVENTION

Various methods for effecting purification of gases containing solvent vapours by adsorption have been devised. As occasion requires, these prior methods involve recovery of the removed solvent vapours. Of these prior methods, a popular method makes use of the so-called fluidized-bed type adsorption system wherein a gas to be treated and adsorbent particles such as activated carbon, activated alumina or silica are brought into mutual contact to form a fluidized bed of the adsorbent particles. In the adsorption treatment of the gas by this fluidized-bed method, it is common practice to effect the gas treatment continuously by having fluidized beds formed in a multiplicity of stages within a tower as illustrated in FIG. 1 of the accompanying drawing, for example. In FIG. 1, 1 denotes a reaction tower. A gas containing solvent vapours to be removed is introduced into the tower 1 through a nozzle 2 in the adsorption section A. On entering the tower interior, the gas ascends vertically and comes into contact with adsorbent particles held inside the adsorption section A, causing the adsorbent particles to form fluidized beds on the stepped trays 3, 3', 3"... The adsorbent particles forming the fluidized beds adsorb the solvent vapours from the gas. The gas which has thus been freed of the solvent vapours is released into the atmosphere via a discharge outlet 4 at the top of the tower 1. The adsorbent particles on the stepped trays 3, 3', 3"..., fall through the downcommers 5, 5', 5"... associated with the trays and descend gradually downwardly by virtue of gravity, while simultaneously adsorbing the solvent vapours from the gas. Then, they leave the adsorption section A and accumulate in the space formed on a partitioning plate 6. While they form a gravitationally moving bed in the space, they gradually reach a regeneration section B which is located at the bottom of the reaction tower 1. On entering the regeneration section B, the adsorbent particles are heated by a heater 7, with the result that the particles are regenerated as they are forced by the heating to release the adsorbed solvent vapours. Subsequently, the regenerated adsorbent particles reaching the bottom 8 of the tower 1 are transferred via a lifting pipe 9 to the top of the tower 1 for recyclic service. In the meantime, the solvent vapours which have been desorbed from the adsorbent particles are forced out of the system via a nozzle 10 by means of a carrier gas introduced via a nozzle 11 disposed in the lower portion of the regeneration section B. The discharged solvent vapours are transferred to a desorbate treating section C composed of a condenser, decanter and the like.

In the afore-mentioned fluidized-bed type gas treatment methods, steam gas is usually employed as the carrier gas for regenerating the adsorbent particles. The steam gas serving as the carrier gas is a useful gas since it can effectively make the adsorbent particles regain the adsorbing power and is also inexpensive. However, when the adsorbent particles containing the adsorbed solvent vapours are subjected to a regeneration treatment by using steam gas as the carrier gas and simultaneously the solvent vapours are subjected to a recovery treatment, the recovered solvent is adulterated with water from condensation of the steam, if the solvent is an organic solvent such as alcohol or ketone, which has compatibility with water. In order to effectively utilize the recovered organic solvent, therefore, it is necessary to separate and remove the water from the recovered solvent. For this purpose, an additional separating unit is required.

As a remedy for the above-mentioned defect arising when a condensable gas such as steam is used as the carrier gas for regenerating the adsorbent particles, the use of an incondensable inert gas such as nitrogen gas is considered to be good. However, in case such an incondensable inert gas is employed as the carrier gas, it must be used in a recyclic way. This is because the incondensable inert gas in general is too expensive to release into atmosphere after use, unlike the case of the steam. The recyclical use of the incondensable inert gas is generally unadvisable. That is, the incondensable inert gas introduced into the regeneration section B (See FIG. 1) comes into contact with the adsorbent particles therein to desorb the solvent vapours from the particles containing the adsorbed solvent vapours, and subsequently the gas accompanied by the solvent vapours thus desorbed is led to the desorbate treating section C (See FIG. 1). The incondensable inert gas thus introduced into the desorbate treating section C is cooled in a condenser to discharge the solvent vapours in the form of liquid, but in this case, the solvent vapours in an amount corresponding to the vapour pressure at the cooling temperature inevitably remain in the incondensable inert gas without being discharged. Accordingly, the incondensable inert gas leaving the desorbate treating section C cannot be introduced into the regeneration section B again as is because the adsorbent particles could not be fully regenerated. For this reason, the remaining solvent vapours must be separated and removed from the gas by means of an additional separating unit prior to the gas being introduced into the regeneration section B. Thus, when the incondensable inert gas is recyclically used, the apparatus and the operation become greatly complicated. Therefore, at the present time, incondensable inert gases are not substantially used as the carrier gas.

SUMMARY OF THE INVENTION

An object of the present invention, therefore, is to provide a novel apparatus for effecting a continuous purification of exhaust gas, which solves the abovementioned problems arising when the incondensable inert gas is recyclically used as the carrier gas for regenerating adsorbent particles.

This and other objects of the present invention will be made clear from the description given below.

In view of the fact that the adsorbent particles which have passed through the adsorption section A (See FIG. 1) still retain somewhat of their adsorbing power, we conducted an experiment by using an incondensable inert gas as the carrier gas and bringing the incondensable inert gas having passed through the desorbate treating section C into contact with the adsorbent particles having passed through the adsorption section A. We have consequently found that the solvent vapours contained in the incondensable inert gas can be efficiently adsorbed onto the adsorbent particles and removed.

According to the present invention, there is provided an improved apparatus for effecting continuous purification of an exhaust gas containing solvent vapours, which includes a column consisting of an adsorption section A, a regeneration section B and a new chamber disposed between the two sections, the chamber being open to these two sections and further being connected to the regeneration section B through the desorbate treating section C.

DETAILED DESCRIPTION OF THE INVENTION

The present invention will be explained below in detail by way of FIG. 2 of the accompanying drawing.

Figure 1:
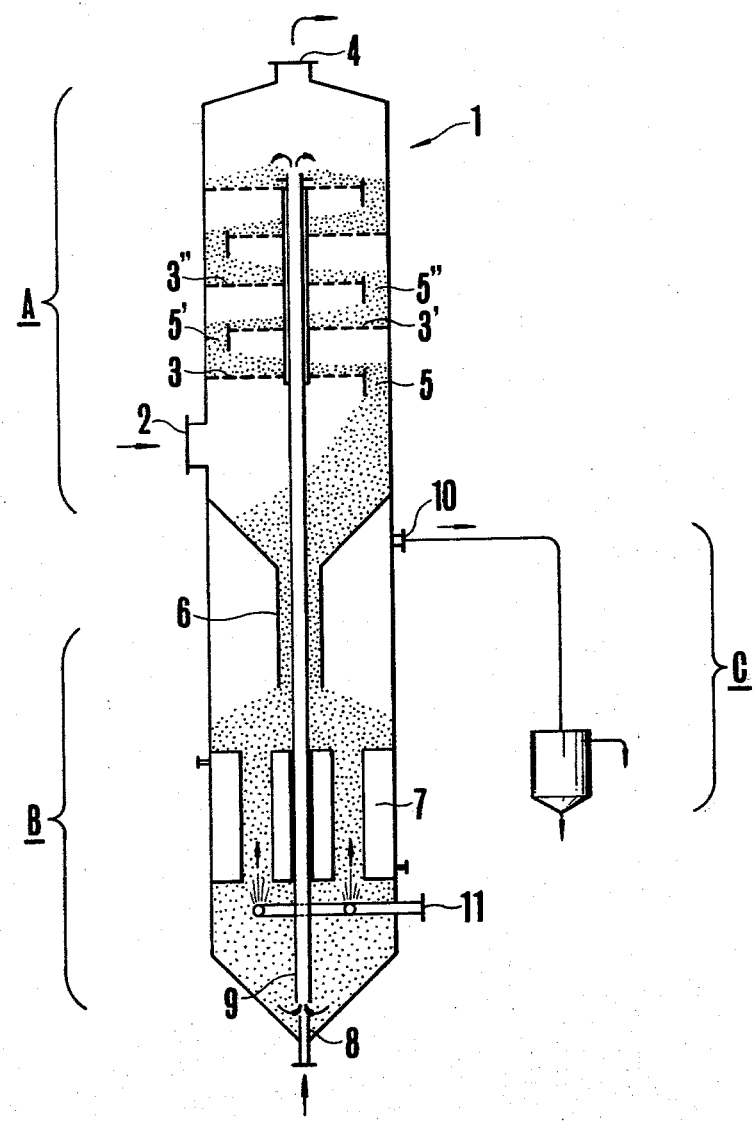
FIG. 1 is a schematic explanatory diagram illustrating one example of a prior art adsorption apparatus used to purify an exhaust gas containing solvent vapours by the fluidized-bed principle.
Figure 2:
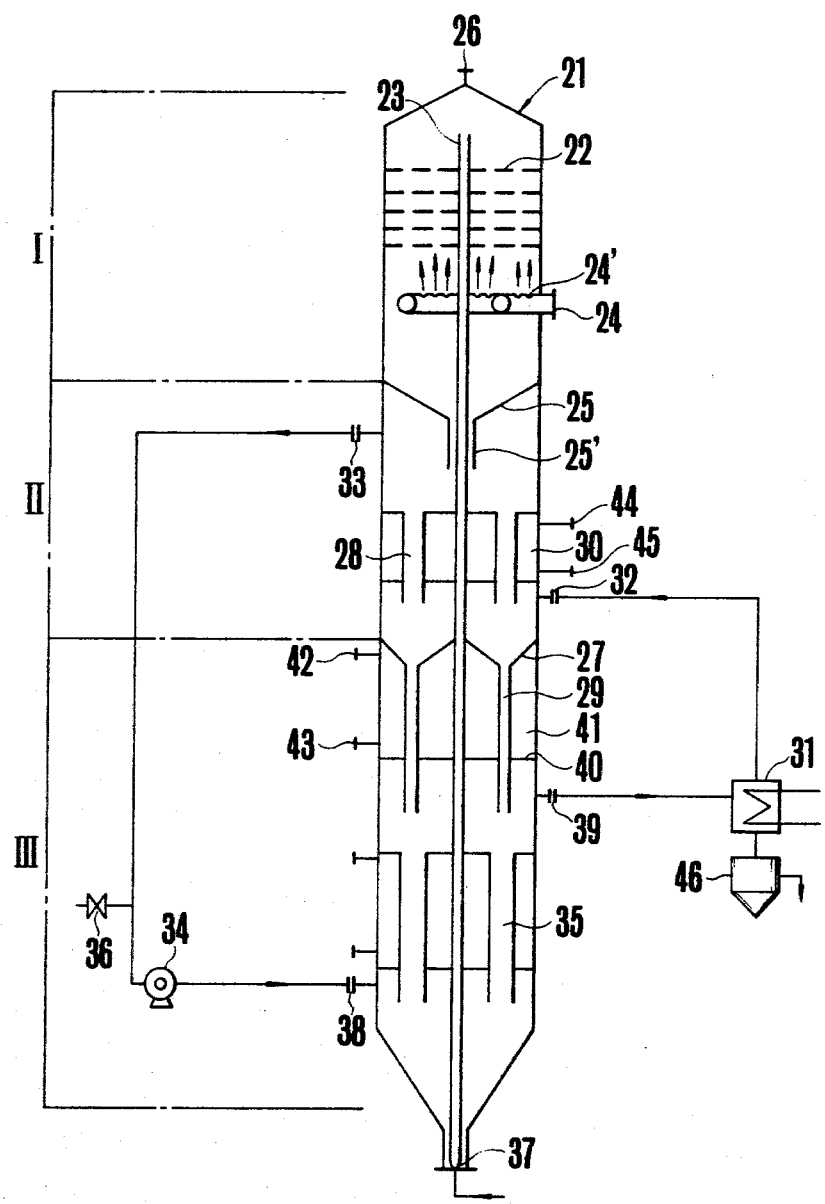
FIG. 2 is a schematic explanatory diagram of the apparatus of the present invention for continuous purification of an exhaust gas containing solvent vapours to be removed.

In FIG. 2, 21 denotes a tower constituting the main body of the apparatus of the present invention. On the top of the tower 21 is an adsorption section I for a gas to be treated. In the middle of the tower 21 is an adsorption section II for a regenerating gas (carrier gas), which constitutes the feature of the present invention. At the bottom of the tower 21 is a regeneration section III for an adsorbent. The adsorption section I is partitioned from the adsorption section II by a particle-partitioning plate 25. In the like manner, the adsorption section II is partitioned from the regeneration section III by a partitioning plate 27. In the center of the tower 21 is provided a lifting pipe 23 for transporting the regenerated adsorbent particles by air stream, the lifting pipe 23 having open ends at the top and bottom of the tower, thus forming a recyclic path for solid adsorbent particles. The lifting pipe 23 does not necessarily have to be located in the tower interior.

The adsorption section I for a gas to be treated in the upper part of the tower 21 takes the form of multi-stage fluidized beds obtained by providing perforated trays 22 in a multiplicity of stages. The gas to be treated, such as a factory exhaust gas containing solvent vapours is introduced from an inlet pipe 24 into the adsorption section I. The introduction of the gas in this case is made at a point below the perforated tray 22 of the lowest stage in the adsorption section I, in such a way that the gas from the dispersion nozzles 24' may flow upwardly within the adsorption section I. The gas to be treated ascends while forming a fluidized bed of the solid adsorbent particles on the perforated tray 22 of each stage. While ascending, the solvent vapours in the gas are adsorbed onto the adsorbent perticles and removed from the gas, so that the gas is purified. The purified gas is then released into the atmosphere from a discharge outlet 26 provided at the top of the tower 21.

On the other hand, the solid adsorbent particles are fed onto the perforated tray 22 of the highest stage from the open end of the lifting pipe 23 at the top of the tower 21, and then fluidized by the upward current of the gas. While forming fluidized beds, the particles descend to lower stages gradually through the apertures of each perforated tray 22 or through the downcommers provided in the perforated tray 22. While forming a fluidized bed on each stage, the particles adsorb the solvent vapours from the gas containing same. On descending from the lowest stage, the particles fall into a pipeline 25' provided in the partitioning plate 25, the pipeline 25' producing a gas-sealing effect when filled with the particles. While forming a moving bed within the pipeline 25', the particles are transferred to the adsorption section II for the regenerating gas, provided in the middle of the tower 21.

The concentration of the solvent vapours contained in the gas introduced for treatment into the adsorption section I is usually controlled to 5000 ppm or below in advance (for example, by diluting the gas with air). This is because the concentration is preferred to be controlled to half the amount of the lean flammability limit for safety's sake. Further, by fixing the solvent concentration in the gas introduced for treatment, the amount of solid adsorbent particles provides a surplus adsorbing power enough to adsorb almost all of the solvent vapours contained in the gas in the adsorption section I and further enough to adsorb almost all of the solvent vapours remaining in the regenerating gas introduced into the adsorption section II.

The adsorption section II in the middle of the tower 21 takes the form of moving beds obtained by providing a plurality of vertical pipes or tubes 28. The incondensable regenerating gas containing the solvent vapours which were neither separated nor recovered by the condenser 31 is introduced into the section II through an inlet nozzle 32, and comes into contact with the adsorbent particles continuously descending through the vertical pipes 28 while forming moving beds, the gas moving countercurrent to the flow of the particles. Then, the gas is discharged from an outlet nozzle 33 provided in the upper wall of the adsorption section II and returned to the regeneration section III. In this case, as the regenerating gas comes into contact with the adsorbent particles descending through the pipes 28 while forming moving beds, the remaining solvent vapours contained in the gas are adsorbed and removed. As the result, the gas discharged for regeneration from the outlet nozzle 33 forms a purified gas suitable for feed to the regeneration section III. By obtaining such a purified regenerating gas, a continuous recyclic use of the gas is made possible.

The regenerating gas introduced into section II through inlet nozzle 32 usually has a very high solvent vapours concentration of 0.5 to 3% by volume, depending upon the temperature of the gas and the type of solvent contained in the gas. Further, adsorption heat generated within pipelines 28 elevates the temperatures of the adsorbent particles and the regenerating gas. In order to prevent the temperatures from rising, therefore, a structure 30 for containing a cooling medium (for example, water) around the vertical tubes 28 may be additionally provided, if necessary. 45 and 44 are an inlet nozzle and an outlet nozzle, respectively, for the cooling medium. Any such structure may be used, so far as the continuous flow of descending adsorbent particles is not disturbed by the structure. For example, it may be a finned tube structure or a partitioning plate type finned inside the vertical tubes 28 and partitioned into a plurality of vertical paths in the interior of the tubes 28.

The adsorbent particles pass through the adsorption section I, flow down through the vertical pipe 25' fixed to a partitioning plate 25 and are led to the vertical pipes 28. Then, the particles adsorb the solvent vapours contained in the regenerating gas while forming moving beds and descending through the pipes 28. The regenerating gas is thus purified. After the particles pass through the pipes 28, they fall down onto the partitioning plate 27 which has the vertical pipes 29 serving as gas-sealing paths as does the vertical pipe 25' and which partitions the adsorption section II from the regeneration section III, and they are then introduced into the regeneration section III. It is preferable that the vertical pipes 29 have comparatively slender and long paths so that gas leakage from the regeneration section III to the adsorption section II can be prevented. This is because the regenerating gas to be exhausted from the desorbed gas-outlet nozzle 39 has a higher pressure than the gas introduced into the adsorption section II. When the vertical pipes 29 have long paths, the gas-sealing effect can be fully produced within the pipes 29. Further, by providing vertical pipes 29 having comparatively long paths the adsorbent particles are conveniently preheated to a temperature necessary for desorbing the adsorbed substances from the adsorbent particles. In the present invention, it is preferable to provide a pre-heating section having an inlet nozzle 42 and an outlet nozzle 43 in communication with a space for containing a heat medium defined by a partitioning plate 27 and a sealing plate 40, in order to preheat the adsorbent particles descending in the form of moving beds within pipes 29. The regeneration unit in the regeneration section III, is a structure consisting of a plurality of vertical pipes 35 in which the adsorbent particles move downwardly in the form of moving beds, as in the adsorption unit in the adsorption section II in the middle of the tower 21. The regeneration unit is so constructed that the adsorbent particles descending in the form of moving beds within the pipelines 35 can be indirectly heated by heat medium through the walls of the pipes 35. Such heating is made possible by providing a jacket or a heating unit of the same structure as that of the above-mentioned pre-heating section around the vertical pipes 35. In order to heat the adsorbent particles within the regeneration section III, the regeneration unit may be indirectly heated such as by a finned tube structure which does not prevent the continuous descent of the adsorbent particles, instead of the vertical pipes 35.

The incondensable regenerating gas used in the present invention is introduced into the regeneration section III from an inlet nozzle 38 by a blower 34 and ascends within the vertical pipes 35. In the interior of the pipes 35, the gas is mixed with the solvent vapours desorbed from the adsorbent particles, and the gas exits through nozzle 39 and is sent to a condenser 31 where the solvent vapours are condensed, separated and recovered. 36 denotes a feed valve for a regenerating gas. The role of the feed valve 36 is to admit fresh incondensable regenerating gas (for example, nitrogen) into the system for the purpose of lowering the concentration of oxygen being incorporated into the recyclic system, for safety's sake or as occasion requires. In the condenser 31, the solvent vapours are condensed and separated from the regenerating gas, and the condensed solvent is recovered in a solvent recovering tank 46. However, inseparable solvent vapours in an amount corresponding to vapour pressure which depends upon the condensation temperature remains in the gas. The feature of the present invention is that the apparatus provides a recyclic route in which the gas is sent to the adsorption section II in order to remove the remaining solvent vapours from the gas and the gas thus regenerated and purified is again introduced into the regeneration section III by the blower 34.

The adsorbent particles pass through the two adsorption sections I and II, and descend within the vertical pipes 35 in the form of moving beds. While the particles pass through pipes 35, they are heated up to a temperature at which the adsorbed solvent vapours desorb. The solvent vapours which have been desorbed and separated from the particles by the above heating are accompanied by the regenerating gas ascending within the pipelines 35, and carried away. The regenerated adsorbent particles are again led to the highest portion of the adsorption section I, which is located at the top of the tower 21, by air stream (for example, dry air) being jetted from a lifting air jet nozzle 37, via a regenerated particle-lifting pipe 23 (the lifting pipe 23) having an open end at the bottom of the tower 21.

In the apparatus of the present invention, the solid adsorbent particles descend downwardly by virtue of gravity gradually from the adsorption section I to the adsorption section II and then to the regeneration section III. In order to facilitate the gravitational transportation of the particles, a special auxiliary transportation unit, for example, a vibration unit for preventing the particles from bridging in the moving beds, or a stirring unit for preventing the particles from slugging or channel, may be additionally installed in the apparatus of the present invention. In order to facilitate the gravitational transportation of solid adsorbent particles, an ordinary mechanical sealing unit may be provided in the pipes 25' and/or pipes 29.

The solid adsorbent particles used in the apparatus of the present invention, are most preferably particles having a shape which is capable of imparting excellent fluidity and forming comparatively dense moving beds to enhance the gas sealing effect, such as spherical activated carbon particles having a comparatively small grain size. By using spherical activated carbon, the apparatus of the present invention can be operated for many hours at a high gas treatment efficiency without requiring an auxiliary unit for transportation of the adsorbent particles. A more detailed explanation will be given below of the effect obtainable when an exhaust gas containing solvent vapours is continuously subjected to the purification treatment by means of the apparatus of the present invention, but the present invention should not be limited to these Examples.

EXAMPLE 1

An apparatus having a structure as shown in FIG. 2 of the accompanying drawing was used. The tower 21 is a cylindrical tower having a height of 5,100 mm and an inner diameter of 500 mm, made of stainless steel. The trays provided in the adsorption section I consist of 6-stepped trays. The lifting pipe 23 has an inner diameter of ¾ inch. The inlet pipe 24 has an inner diameter of 4 inches and is ring-shaped within the tower 21. The vertical pipe 25' has an inner diameter of 3/2 inch and a length of 200 mm. The vertical pipes 28 are eight in number and each pipe has an inner diameter of 4 inches and a length of 250 mm. Further, in order to cool the pipe 28, water is introduced into the structure 30 from an inlet nozzle 45. Pipes 29 are eighteen in number and each has an inner diameter of ½ inch and a length of 800 mm. The pipes 29 can be indirectly heated by steam. The pipes 35 are eighteen in number and each has an inner diameter of 2 inches and a length of 600 mm. 31 denotes a shell and tube type heat exchanger which has a heating area of 2.8 m². Compressed air is injected from a nozzle 37 to lift the regenerated adsorbent particles. In the aforementioned apparatus, air at 27° C. containing 1200 ppm by volume of isopropyl alcohol was treated at a velocity of 550 Nm³/hour by using spherical activated carbon having an average grain size of 720μ. The result showed that when the amount of activated carbon circulated was fixed at 14 kg/hour, the isopropyl alcohol concentration in the purified gas became 50 ppm by volume or below, and the amount of isopropyl alcohol recovered was 1.65 kg/hour. The water content in the recovered isopropyl alcohol was about 0.1% by weight when measured in accordance with Karl Fischer's method. The interior temperature of the vertical pipes 35 was 145° C. Nitrogen gas was used as a regenerating gas and the amount of nitrogen gas circulated was 4.5 Nm³/hour. Further, the oxygen concentration in the gas must be kept at 10% by volume or below for safety's sake. Therefore, the amount of pure nitrogen gas introduced into the circulation line was 0.15 Nm³/hour.

EXAMPLE 2

In the same apparatus as used in Example 1, air at 30° C. containing 1600 ppm of toluene was treated at a velocity of 600 Nm³/hour using similar activated carbon. The result showed that when the amount of activated carbon circulated was fixed at 21 kg/hour, the toluene concentration in the purified gas was about 30 ppm. The interior temperature of the vertical pipes 35 in this case was 150° C. Further, the amount of nitrogen circulated as the regenerating gas was 4.5 Nm³/hour. The amount of toluene recovered was 3.7 kg/hour.

Further, in order to keep the oxygen concentration in the regenerating gas circulation line at 10% by volume or below, the amount of pure nitrogen introduced into the line was 0.18 Nm³/hour. The water content in the recovered toluene was 0.05% by weight.

What is claimed is:

1. An adsorption process for removing organic solvent vapours from a gas stream comprising:
    (a) passing the gas stream through a fluidized bed of adsorbent particles contained in a first zone to adsorb the organic solvent vapours and to form a first purified gas;
    (b) continuously circulating a portion of the adsorbent particles through second and third zones, each containing a moving bed of said adsorbent particles, successively, and then returning said portion to the first zone;
    (c) contacting said adsorbent particles in said third zone at a high temperature with an inert gas to desorb said organic vapours, thus forming a third gaseous quantity containing said inert gas and the desorbed organic vapours;
    (d) removing said third quantity from said third zone at a high temperature and cooling said third quantity to condense and remove a major portion of said organic vapours as liquid, thus forming a second gaseous quantity containing cooled inert gas and a minor portion of said organic vapours in the gaseous phase;
    (e) passing said second gaseous quantity into said second zone for contact with said adsorbent particles exiting said first zone to remove the minor portion of the organic vapours from the inert gas, thus purifying the inert gas; and
    (f) recycling the purified inert gas from step e to said third zone for contact with said adsorbent particles.

2. An adsorption apparatus for the continuous purification of exhaust gases contaminated with solvent vapours, comprising, in a single column:
    (a) a first adsorption chamber having a plurality of perforated plates for forming fluidized beds of solid adsorbent particles, means for introducing an exhaust gas containing solvent vapours into said chamber, and means for discharging purified gas;
    (b) a second adsorption chamber provided downstream of said first adsorption chamber and partitioned therefrom by a partition providing a gas seal in cooperation with solid adsorbent particles coming from said first adsorption chamber, and associated with means for transferring the adsorbent particles from said first adsorption chamber to said second adsorption chamber and with means for forming moving beds of adsorbent particles;
    (c) a regenerating chamber provided downstream of said second adsorption chamber and partitioned therefrom by a partition providing a gas seal in cooperation with solid adsorbent particles from said second adsorption chamber, said regenerating chamber having means for forming downwardly moving beds of adsorbent particles and means for transfer of the solid adsorbent particles from said second adsorption chamber;
    (d) an incondensable regenerating gas recycling circuit leading from said second adsorption chamber to said regenerating chamber for continuously circulating an inert incondensable regenerating gas to said regenerating chamber;
    (e) a condensing circuit leading from said regenerating chamber to said second adsorption chamber and having a condenser for condensing a major portion of solvent vapours contained in the regenerating gas exiting said regenerating chamber; and
    (f) an adsorbent particle recycling passage leading from said regenerating chamber to said first adsorption chamber for transfer of regenerated adsorbent particles.

3. The apparatus of claim 2, wherein each of said second and third zones contains a plurality of vertical pipe members in which said moving beds are formed.

* * * * *